Sept. 5, 1950 — A. F. McMAHON — 2,521,472
CARBONATOR CONTROL
Filed March 28, 1946
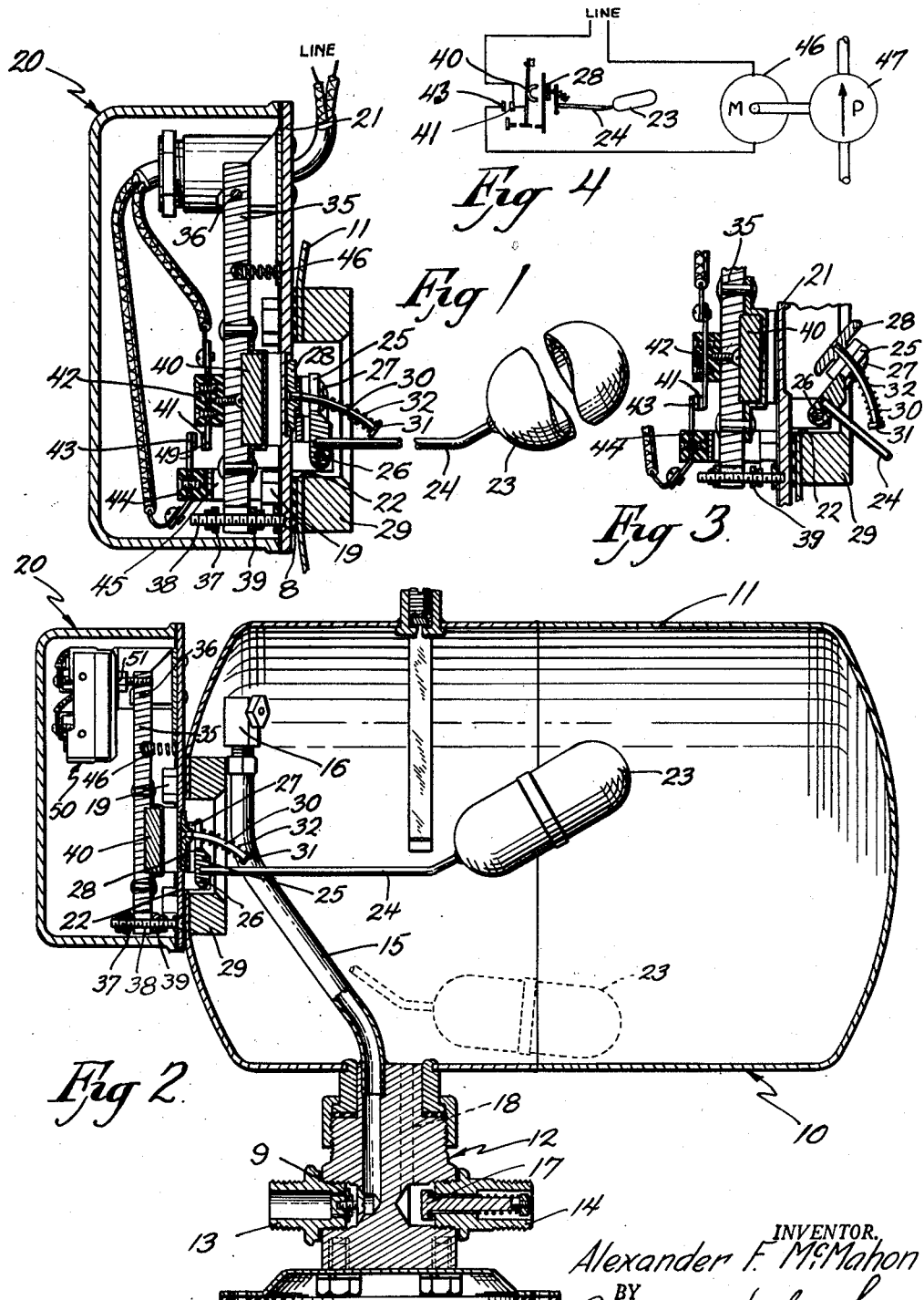
INVENTOR.
Alexander F. McMahon Patented Sept. 5, 1950

2,521,472

UNITED STATES PATENT OFFICE 2,521,472

CARBONATOR CONTROL

Alexander F. McMahon, Oak Park, Ill., assignor to The Bastian-Blessing Company, Chicago, Ill., a corporation of Illinois Application March 28, 1946, Serial No. 657,821

9 Claims. (Cl. 200—84)

This invention relates generally to liquid level control switches and more particularly to a liquid level control switch for a device that carbonates water. Carbonators usually comprise a tank having a carbon dioxide gas inlet effective below the water level limits and a water spray inlet effective in the gas space. The gas is supplied from high pressure cylindrical containers through a pressure reducing regulator, and, at a pressure controlled by the regulator, is dissolved as it bubbles upwardly through the water and as the water is sprayed through the gas atmosphere. The pressure of the gas and the temperature of the water determines the degree of carbonation possible.

The pressure of gas in a carbonator usually ranges above the water main pressure in most communities. Consequently the water must be pumped into the tank at a pressure sufficiently superior to the gas pressure to spray the water.

Furthermore, carbonation is usually carried out as a batch process rather than as a continuous operation. Water is replenished in the tank rapidly in a quick pumping cycle and then withdrawn over a period of time as needed. Carbonation is accelerated during the pumping cycle but continues as the water is withdrawn by the bubbling of replenishing gas through the water.

Electrically actuated motors are generally used to drive the pumps, and the problem of controlling the motor on the outside of the tank in connection with a liquid level responsive device in a carbonator is confronted with many difficulties involving taste contamination of the water, electrolysis and corrosion, loss of expensive $CO_2$ gas through packings, sensitivity of control, snap action of electrical controls, and dampness and chill of refrigeration.

Efforts to solve all of these problems favorably as a composite proposition have not been successful because the use of stuffing boxes to permit sealed transmission of movement through a wall of the carbonator tank has been accompanied by taste contamination of the water by the packing gland, and a loss of sensitivity of movement in the transmission due to friction developed by a gland tight enough to prevent loss of $CO_2$.

A balancing tank, such as shown in Bastian Patent No. 932,093, has and is being used quite extensively upon the larger carbonators but for a carbonator that is to be mounted within expensive refrigerated space, such a construction is too bulky.

The use of magnetic flux has also been proposed, but short cycling of the pump, or the need for as many as three switches and a relay control is required. Otherwise the switch contacts require frequent replacement and the mechanism repeated adjustments.

One of the objects of the present invention is to provide a carbonator which solves the above mentioned problems with a single switch connected directly in the power circuit of the pump motor which switch will be controlled to operate between wide limits of water levels in the carbonator tank.

A second object is to provide an improved liquid level control device wherein a float within the liquid container is magnetically linked to the switch mechanism outside the tank so that the switch contacts will close at one water level and open at a second higher level.

Another object is to provide an improved magnetically controlled apparatus which will produce a snap action at the opening and closing of the switch contacts and hold the contacts tightly together when in the closed position.

The invention is further characterized by a snap action control carried by a float valve for actuating the switch of a motor circuit located outside of the tank.

Another object is to provide a control device whose elements, that are located within the carbonator tank, can be constructed entirely of stainless steel to eliminate corrosion due to electrolysis and carbonic acid.

Another object is to provide a liquid level control device which will not require frequent servicing, yet is easily constructed and placed in operation.

Further objects and features of novelty will be apparent to those familiar with the art on examination of the drawing, the specification and the appended claims.

In the drawings:

Fig. 1 is a longitudinal cross section of the preferred embodiment of this invention.

Fig. 2 is a sectional view of a modification of the control device mounted on a carbonator.

Fig. 3 is a sectional view showing a portion of a control device within the switch contacts in the closed position, and Fig. 4 is a diagrammatic view of the preferred electrical circuit.

In Fig. 2 an embodiment of this invetnion is shown installed in a conventional carbonator 10. The carbonator tank 11 is mounted on a pedestal base 12 having inlet connections for water and carbon dioxide. The water inlet 13 is provided with a check valve 9 and is connected to a tube 15 which extends up into the tank 11. The tube 15 is provided with a spray nozzle 16 at its upper end. The carbon dioxide inlet 14 is provided with a check valve 17 and is connected by a passage 18 to the bottom of the tank 11. A carbonated water outlet (not shown) is also provided in the pedestal 12.

The control device 20 is mounted in one end of the tank 11. The non-magnetic stainless steel switch mounting plate 21 is bolted to a flanged circular opening 22 in the tank 11. The float 23 is carried by an arm 24 which is mounted on the lever 25. The lever 25 rotates about a pin 26 which also carries the pole piece support 27. The disc shaped magentic stainless steel piece 28 is fastened to the upper end of the support 27. Thus both the pole piece 28 and the lever 25 are free to rotate about the pin 26.

The upper end of the lever 25 is slotted so that a curved shaft 30 fixed to the inward side of the pole piece 28 may extend inward past the lever 25. The curved shaft 30 is provided with a head 31 on its inward end so that a spring 32 may be mounted about the shaft 30 so as to bear against the head 31 and the hinged lever 25. This spring 32 tends to hold the pole piece 28 adjacent to the lever 25.

In Fig. 3 the preferred embodiment of the control device 20 is shown. The pivot arm 35 is rotatably mounted on the pivot pin 36. Movement of the pivot arm 35 is limited by the adjustable nuts 37 on the stop screw 38. The pivot arm 35 carries a permanent magnet 40 whose poles are in alignment with the pole piece 28 although the two are separated by the switch mounting plate 21. The pivot arm 35 also carries an electrical contact 41 which is insulated from the pivot arm 35 by a block of insulating material 42. A second contact 43 is also supported by a block of insulating material 44 on a bracket 45 which is secured to the mounting plate 21. Both contacts are supported by flexible copper strips 49 so that the switch will have a slight over-travel and the contacts 42 and 43 will be held together by the spring pressure of the flexible strips 49. Thus movement of the pivot arm 35 will result in an opening or closing of the two contacts. A spring 46 tends to hold the pivot arm 35 away from the mounting plate 21 except when magnetic force overcomes the spring pressure.

All of those parts of the switch which are located within the tank are made of stainless steels so as to be resistant to corrosion.

The operation of this invention is as follows: When the water level in the carbonator falls to a predetermined low point the float 23 assumes the position shown by the broken lines in Fig. 2. The arm 24 causes the hinged lever 25 to rotate about the pin 26. The spring 32 is compressed until the compression force overcomes the magnetic attraction between the pole piece 28 and the magnet 40, and the pole piece snaps away from the mounting plate 21. When the distance between the pole piece 28 and the magnet 40 is suddenly increased, the magnetic force rapidly decreases and the pivot arm spring 46 forces the pivot arm outward closing the electrical contacts 41 and 43. Electric current then flows to the motor 46 which drives the water pump 47. As water is pumped into the tank the float rises moving the lever 25 and the pole piece toward the magent 40. When the water level reaches the upper limit the magnet attraction overcomes the force required to compress the spring 32 and the pole piece 28 moves independently of the lever 25 and snaps into position against the mounting plate. The magnetic attraction is greatly increased as the distance between the magnet 40 and the pole piece is reduced, and the pivot arm 35 overcomes the pressure of the spring 46 and snaps inward opening the electrical contacts 41 and 43. Current ceases to flow to the electric motor 46, and the pump 47 stops.

As carbonated water is withdrawn from the tank the water level falls until it reaches the predetermined low point and the cycle is repeated.

The modification of this invention shown in Fig. 2 is similar to the above described embodiment except that a unitary switch 50 is mounted so that the switch button 51 is actuated by movement of the pivot arm 35. The operation of this modified embodiment is similar to that described.

The heights of the wateer level at which pumping starts and stops can be readily adjusted by means of the adjusting nuts 37 on the stop screw 38. If it is desired to raise the level at which pumping starts the nut 39 may be screwed inward so that the pivot arm and magnet 40 are farther from the pole piece 28 when the switch is in the open poistion. Therefore less force of the spring 32 will be required to overcome the magnetic attraction and the pole piece 28 will snap away sooner allowing the pivot arm 35 to close the contacts 41 and 43.

If the point at which pumping stops is to be raised the nut 37 can be screwed outward moving the magnet 35 farther from the pole piece 28 when the contacts 41 and 43 are in the closed position and thereby delaying the point at which the pole piece 28 will overcome spring. In this case, if the desired change in level is appreciable, the electrical contacts may have to be readjusted so that one will press against the other with the proper pressure when in the closed position.

This control device is superior to those in the prior art in several ways. The combination of the lever mounted pole piece 28, lever mounted float 23, and the elastic linkage between the two provided by the spring 32 makes it possible to use a single pair of contacts and still have the motor turn on at one level and off at a second level which is some distance above the first. In most prior switches this time delay was not possible without at least two separate pairs of contacts being employed.

This lever and spring combination also serves to impart the desired snap action to the contacts. Magnetic force between a magnet and pole piece varies as the square of the distance between the two. The spring link between the pole piece 28 and the lever 25 allows the relatively light weight pole piece 28 to move rapidly toward the magnet as soon as the magnetic force is great enough to overpower the spring 32. Thus before the relatively heavy pivot arm 35 can carry the contact 41 away from the contact 43, the light pole piece 28 has moved into a position which is but a fraction of the previous distance away from the magnet, and the greatly increased magnetic force suddenly pulls pivot arm inward and opens the contacts.

Both of the above mentioned advantages tend to minimize the amount of servicing required, for the number of contacts is reduced and the possibility of the remaining set of contacts being made inoperative by arcing is eliminated.

A further advantage is obtained by constructing those parts of the switch which are in contact with carbonated water of stainless steels. Thus it is insured that the carbonated water produced will be pure and that the switch will not fail due to corrosion of the moving parts.

Various modifications and changes may be made in the described embodiments without departing from the spirit of the invention whose scope is shown in the appended claims. Although the liquid level control device of this invention has been described as installed in a carbonator, it is not intended that the scope of invention be limited to carbonators, for similar switches could be used to control the height of any liquid in any enclosed tank. In other cases an electric current controlled by this invention could be used to open and close a valve rather than run a motor.

What is claimed is:

1. For use in a carbonator, a liquid level control device comprising a movable member, a pair of electrical contacts disposed so that movement of said member operates said contacts, a magnet mounted on said member, a water tight wall, a movable pole piece on the opposite side of said wall from said magnet, a lever mounted float, said pole piece and said float rotating about a common center, and a spring disposed between said float lever and said pole piece so that rotation of said float with respect to said pole piece will compress the spring.

2. In a liquid level control device the combination including a lever mounted float free to rotate about a point, a lever mounted pole piece free to rotate about said point, a spring disposed between said levers so as to be compressed by motion of said float relative to said pole piece, a movably mounted magnet, a nonmagnetic wall separating said magnet and said pole piece and a pair of electrical contacts so disposed as to be opened and closed by motion of said magnet.

3. In a liquid level control device, the combination including a movably mounted magnet, a pair of electrical contacts so disposed as to be opened and closed by movement of the magnet, the magnet having a normal position which defines a position of the electrical contacts, a lever mounted float free to rotate about a pivot, a lever mounted pole piece free to rotate about said pivot and movable into magnetic relationship with the magnet, a resilient means holding levers in engaging relation when the float is in its uppermost position and compressed when the float is moved away from this position, said resilient means being effective after being compressed a predetermined amount to move the pole piece away from the influence of the magnet by snap action, such movement of the pole piece being effective in restoring the magnet to its normal position.

4. In a liquid level control device, the combination including a movably mounted magnet, a pair of electric contacts actuated by movement of the magnet, a lever mounted float free to rotate about a pivot, a lever mounted pole piece free to rotate about said pivot and movable into magnetic relationship with the magnet, a resilient means for urging said pole piece away from said magnet, said means acting between said levers and being extended when the float is in its uppermost position and compressed when the float is moved away from this position, said resilient means being effective after being compressed a predetermined amount to move the pole piece away from the influence of the magnet by snap action, such movement of the pole piece being effective in restoring the magnet to its normal position, and a wall of nonmagnetic material disposed between said magnet and pole piece.

5. For use in a carbonator having a motor driven pump, a control switch for said motor responsive to the level of liquid in the cabonator comprising a liquid-tight wall, a pivotally mounted member supported on said wall so as to be rotatable in a plane perpendicular to said wall, a permanent magnet carried by said member, the poles of said magnet facing said wall, a liquid level-responsive float member pivotally mounted on the opposite side of said wall from said first mentioned member, a pole piece of magnetic material pivotally mounted on said opposite side of said wall and movable to a position adjacent thereto, resilient means for elastically linking said float member to said pole piece, said resilient means storing energy as the liquid level falls and releasing said energy to move the pole piece away from said wall when the level reaches a predetermined minimum, a second resilient means for urging the first mentioned member away from said wall as said pole piece moves away therefrom, electrical contact means including a fixed contact and a movable contact, the position of said movable contact being determined by said first mentioned member, and a pair of adjustable stops for limiting rotation of said member whereby the liquid levels at which said contacts open and close may be adjusted.

6. In a liquid level control device, the combination including a movably mounted magnet, an adjustable stop for limiting movement of said magnet, a pair of electrical contacts so disposed as to be opened and closed by movement of the magnet, the magnet having a normal position which defines a position of the electrical contacts, a lever mounted float free to rotate about a pivot, a lever mounted pole piece free to rotate about said pivot and movable into magnetic relationship with the magnet, a resilient means holding levers in engaging relation when the float is in its uppermost position and compressed when the float is moved away from this position, said resilient means being effective after being compressed a predetermined amount to move the pole piece away from the influence of the magnet by snap action, such movement of the pole piece being effective in restoring the magnet to its normal position, and said adjustable stop permitting variation of the liquid level at which said resilient means becomes effective.

7. In a liquid level control device, the combination including a movably mounted magnet, a pair of electric contacts actuated by movement of the magnet, a lever mounted float free to rotate about a pivot, a lever mounted pole piece free to rotate about said pivot and movable into magnetic relationship with the magnet, a spring for urging said pole piece away from said magnet supported on an arcuate member carried by the pole piece, said spring acting between said levers and being extended when the float is in its uppermost position and compressed when the float is moved away from this position, said spring being effective after being compressed a predetermined amount to move the pole piece away from the influence of the magnet by snap action, such movement of the pole piece being effective in restoring the magnet to its normal position, and a wall of nonmagnetic material disposed between said magnet and pole piece.

8. For use in a carbonator, a liquid level control device comprising a lever mounted float, a lever mounted pole piece, a spring supported on an arcuate element and linking said float and said pole piece, a movably mounted magnet separated from said pole piece by the wall of the liquid container, and a pair of electrical contacts mounted so as to be operated in relation to the position of said movable magnet.

9. A liquid level control device comprising a pair of electrical contacts, a movable member disposed to open and close said contacts when moved, a magnet mounted on said member, a movably mounted pole piece separated from said magnet by a nonmagnetic wall, a float disposed in the liquid container, and a linkage elastically connecting said float and said pole piece so that said float may move independently of said pole piece, said linkage including a spring element supported on an arcuate member.

ALEXANDER F. McMAHON.

REFERENCES CITED

The following references are of record in the file of this patent:

UNITED STATES PATENTS

| Number | Name | Date |
|---|---|---|
| 712,292 | Geddes | Oct. 28, 1902 |
| 983,976 | Carpenter | Feb. 14, 1911 |
| 1,434,574 | Walter et al. | Nov. 7, 1922 |
| 2,116,415 | Shenton | May 3, 1938 |
| 2,231,158 | Davis | Feb. 11, 1941 |
| 2,300,300 | Lund | Oct. 27, 1942 |
| 2,339,640 | Holinger | Jan. 18, 1944 |